United States Patent
Sakanaka et al.

(10) Patent No.: US 12,047,671 B2
(45) Date of Patent: Jul. 23, 2024

(54) IMAGING DEVICE AND INFORMATION PROCESSING METHOD

(71) Applicant: SONY GROUP CORPORATION, Tokyo (JP)

(72) Inventors: Motoe Sakanaka, Tokyo (JP); Asuka Suzuki, Tokyo (JP); Kazuki Komoriya, Tokyo (JP); Go Fukushi, Tokyo (JP); Hiroyuki Abe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 70 days.

(21) Appl. No.: 17/758,184

(22) PCT Filed: Nov. 17, 2020

(86) PCT No.: PCT/JP2020/042731
§ 371 (c)(1),
(2) Date: Jun. 29, 2022

(87) PCT Pub. No.: WO2021/140746
PCT Pub. Date: Jul. 15, 2021

(65) Prior Publication Data
US 2022/0394188 A1    Dec. 8, 2022

(30) Foreign Application Priority Data

Jan. 9, 2020   (JP) ................. 2020-002204

(51) Int. Cl.
*H04N 23/63* (2023.01)
*H04N 23/611* (2023.01)
(Continued)

(52) U.S. Cl.
CPC ......... *H04N 23/631* (2023.01); *H04N 23/611* (2023.01); *H04N 23/617* (2023.01);
(Continued)

(58) Field of Classification Search
CPC .... H04N 23/61; H04N 23/611; H04N 23/617; H04N 23/62; H04N 23/631; H04N 23/65; H04N 23/651; H04N 25/68; H04N 25/683
See application file for complete search history.

(56) References Cited

U.S. PATENT DOCUMENTS

| | | | |
|---|---|---|---|
| 2006/0062563 A1* | 3/2006 | Yoon ..................... | G03B 17/18 |
| | | | 396/283 |
| 2006/0147193 A1* | 7/2006 | Yamamoto ............. | G03B 29/00 |
| | | | 348/E5.042 |

(Continued)

FOREIGN PATENT DOCUMENTS

| | | |
|---|---|---|
| JP | 2004-096635 A | 3/2004 |
| JP | 2010-154438 A | 7/2010 |

(Continued)

OTHER PUBLICATIONS

International Search Report and Written Opinion of PCT Application No. PCT/JP2020/042731, dated Feb. 16, 2021, 10 pages of ISRWO.

*Primary Examiner* — Daniel M Pasiewicz
(74) *Attorney, Agent, or Firm* — CHIP LAW GROUP

(57) ABSTRACT

Provided is an optimal user interface for curbing sound generated by an imaging device. For this purpose, the imaging device includes a user interface control unit that performs user interface processing of enabling selection of whether or not to curb at least a part of sound generated in a first period from a power-on state until issuance of a transition instruction to a power-off state and a second period from the issuance of the transition instruction until the power-on state, and a switching control unit that changes control related to sound according to a selection result of the user interface processing.

20 Claims, 11 Drawing Sheets

(51) Int. Cl.
*H04N 23/617* (2023.01)
*H04N 23/65* (2023.01)
*H04N 23/667* (2023.01)
*H04N 25/683* (2023.01)

(52) U.S. Cl.
CPC ........... *H04N 23/65* (2023.01); *H04N 23/667* (2023.01); *H04N 25/683* (2023.01)

(56) References Cited

U.S. PATENT DOCUMENTS

| | | |
|---|---|---|
| 2013/0230307 A1 | 9/2013 | Kimura |
| 2017/0099432 A1* | 4/2017 | DeLuca ................. H04N 23/71 |
| 2020/0264832 A1* | 8/2020 | Kobayashi ............... H04R 3/12 |
| 2021/0072950 A1* | 3/2021 | Kasugai ................. G03B 13/06 |

FOREIGN PATENT DOCUMENTS

| | | |
|---|---|---|
| JP | 2013-183346 A | 9/2013 |
| JP | 2019-216410 A | 12/2019 |

* cited by examiner

FIG. 7

```
[◯]₁ [◯]₂ ⊕ ▷ 🧰 ☆                        81
─────────────────────────────────
SHUTTER/CAMERA SHAKE CORRECTION  ◀5/11▶
 ▦ SHUTTER TYPE                   AUTO
ELECTRONIC FRONT CURTAIN SHUTTER   ON
RELEASE WITH NO LENS              ALLOW
RELEASE WITH NO MEMORY CARD       ALLOW
CAMERA SHAKE CORRECTION            ON
CAMERA SHAKE CORRECTION SETTING
    □□□□■□□□□□  🗑 ?  MENU ↺
```

FIG. 8

```
[◯]₁ [◯]₂ ⊕ ▷ 🧰 ☆                        82
─────────────────────────────────
              AF2                ◀6/14▶
 ▦ AF FILL-IN LIGHT               AUTO
FACE/EYE AF SETTING
 ▦ AF SUBJECT TRACKING SENSITIVITY   —
 ▦ DIAPHRAGM DRIVING AT TIME OF AF STANDARD
 ▦ SHUTTER HALF-PRESS AF           ON
 ▦ PRE-AF                         OFF
   □□□□□□■□□□□□ 🗑 ?  MENU ↺
```

IMAGING DEVICE AND INFORMATION PROCESSING METHOD

CROSS REFERENCE TO RELATED APPLICATIONS

This application is a U.S. National Phase of International Patent Application No. PCT/JP2020/042731 filed on Nov. 17, 2020, which claims priority benefit of Japanese Patent Application No. JP 2020-002204 filed in the Japan Patent Office on Jan. 9, 2020. Each of the above-referenced applications is hereby incorporated herein by reference in its entirety.

TECHNICAL FIELD

The present technology relates to an imaging device, an information processing method, and a program, and particularly relates to a technology of curbing sound generated by an imaging device.

BACKGROUND ART

In an imaging device, sound may be generated when various operations are executed. Specifically, for example, when a mechanical shutter operates in response to a release operation, a drive sound of the mechanical shutter is generated.

However, there is a demand for quiet imaging depending on the imaging scene. Patent Document 1 discloses a technology related to an imaging device having a silent imaging mode. In the silent imaging mode, sound generation is curbed by not using the mechanical shutter.

CITATION LIST

Patent Document

Patent Document 1: Japanese Patent Application Laid-Open No. 2019-216410

SUMMARY OF THE INVENTION

Problems to be Solved by the Invention

However, depending on the imaging scene, it may be insufficient to merely curb the drive sound of the mechanical shutter mechanism at the time of the release operation. For example, there is a case where a wild bird, which is a subject, is scared off by a sound generated by the imaging device other than that at the time of the release operation.

In view of the foregoing, an object of the present technology is to provide an optimal user interface for curbing sound generated by an imaging device.

Solutions to Problems

An imaging device according to the present technology includes a user interface control unit that performs user interface processing of enabling selection of whether or not to curb at least a part of sound generated in a first period from a power-on state until issuance of a transition instruction to a power-off state and a second period from the issuance of the transition instruction until the power-on state, and a switching control unit that changes control related to sound according to a selection result of the user interface processing.

The first period includes a time zone in which imaging is attempted with the subject captured in the angle of view. Additionally, the second period includes a time zone in which imaging of the subject is not attempted. Accordingly, in the user interface processing, it is possible to perform setting so as to curb sound generated both at the time of imaging and at the time of non-imaging.

In the above-described imaging device, the user interface processing may include processing of enabling selection of whether or not to curb at least a part of the sound generated in the first period.

As a result, a user interface for curbing the sound generated in the first period is provided to the user.

In the above-described imaging device, the user interface processing may include processing of enabling selection of whether or not to curb at least a part of the sound generated in the second period.

As a result, a user interface for curbing the sound generated in the second period is provided to the user.

In the above-described imaging device, the user interface processing may perform presentation for selecting whether or not to curb the drive sound of the mechanical shutter mechanism according to the release operation.

As a result, when the option of turning on the sound curbing function is selected from the ON/OFF options of the sound curbing function presented in the user interface processing, the drive sound of the mechanical shutter mechanism based on the release operation is curbed.

In the above-described imaging device, the user interface processing may include presentation for selecting whether or not to curb the operation sound of the operation element.

As a result, in a case where the option of turning on the sound curbing function is selected on the basis of the user interface processing, the operation sound such as an electronic sound is curbed.

In the above-described imaging device, the user interface processing may include presentation for selecting whether or not to curb the drive sound of the diaphragm mechanism at the time of autofocus control.

As a result, when the option of turning on the sound curbing function is selected on the basis of the user interface processing, the drive sound of the diaphragm mechanism at the time of autofocus control is curbed.

In the above-described imaging device, the user interface processing may include presentation for selecting whether or not to curb the drive sound of the mechanical shutter mechanism generated when the mechanical shutter is closed according to the transition instruction.

As a result, when the option of turning on the sound curbing function is selected on the basis of the user interface processing, the drive sound of the mechanical shutter mechanism at the time of transition to the power-off state is curbed.

In the above-described imaging device, the user interface processing may include presentation for selecting whether or not to curb the drive sound of the mechanical shutter mechanism in the auto pixel mapping function.

As a result, when the option of turning on the sound curbing function is selected on the basis of the user interface processing, the auto pixel mapping function is controlled not to operate.

In the above-described imaging device, the user interface processing may include presentation that enables setting of whether or not to curb sound for each type of sound generated in the first period and the second period.

As a result, whether or not the user curbs the sound can be customized for each type of sound.

In the above-described imaging device, the user interface processing may include presentation of an operation element for setting details as to whether or not to curb the sound generated in the first period and the second period.

As a result, an operation element for customizing whether or not the user curbs sound is provided.

In the above-described imaging device, in the detailed settings, the user interface control unit may perform presentation that enables setting of a setting item as to whether or not to curb a drive sound of a diaphragm mechanism at a time of autofocus control, a setting item as to whether or not to curb a drive sound of a mechanical shutter mechanism generated when a mechanical shutter is closed according to the transition instruction, and a setting item as to whether or not to curb a drive sound of the mechanical shutter mechanism in an auto pixel mapping function.

As a result, various operations for customizing whether or not the user curbs sound can be performed on the detailed settings screen.

In the above-described imaging device, in the detailed settings, the user interface control unit may display an unchangeable item.

As a result, the user can grasp the content of the current setting regarding sound curbing even for the unchangeable item.

In the above-described imaging device, the unchangeable item may include a setting item as to whether or not to curb the drive sound of the mechanical shutter mechanism according to the release operation and a setting item as to whether or not to curb the operation sound of the operation element.

As a result, in a case where the option of turning on the sound curbing function is selected on the basis of the user interface processing, the drive sound and the operation sound of the mechanical shutter mechanism according to the release operation are curbed, and the user can recognize the state.

The above-described imaging device may further include an automatic identification processing unit that automatically identifies a subject, and the switching control unit may perform control for curbing sound generated in the first period and the second period when the automatic identification processing unit recognizes the subject as an organism.

An organism may be, for example, a wild bird, a wild animal, or the like, or may be a human.

The switching control unit in the above-described imaging device may perform focus control by a predetermined operation and also perform control for curbing sound generated in the first period and the second period.

It is assumed that a timing at which focus control is performed is a timing at which the user is about to image the subject.

The above-described imaging device may further include a scene specifying unit that specifies an imaging scene, and the switching control unit may perform control for curbing sound generated in the first period and the second period according to the specified imaging scene.

As a result, in a case where the current imaging scene is an imaging scene in which it is desirable not to generate sound related to imaging such as a musical performance or a concert, the control can be automatically switched to control for curbing sound.

The above-described imaging device may further include a sound input unit to which a sound signal is input, and the switching control unit may perform control for curbing sound generated in the first period and the second period in a case where a signal level of the sound signal input to the sound input unit is equal to or less than a predetermined value.

The fact that the signal level of the sound signal input to the sound input unit is equal to or less than the predetermined value indicates a quiet environment or the like. When sound is generated in such a case, the sound may stand out.

The above-described imaging device may further include an attaching part to which a lens barrel is attached, and when an operation for detaching the lens barrel from the attaching part is detected, the switching control unit may perform control for closing a mechanical shutter even with a setting for curbing sound generated in the first period and the second period.

When the lens barrel is detached, dust or the like may adhere to the image sensor or the like, and performance may be deteriorated. When the operation for detaching the lens barrel is detected, the mechanical shutter is closed regardless of the sound curbing setting.

An information processing method according to the present technology is performed by an information processing device, the method including user interface processing of enabling selection of whether or not to curb at least a part of sound generated in a first period from a power-on state until issuance of a transition instruction to a power-off state and a second period from the issuance of the transition instruction until the power-on state, and switching processing of changing control related to sound according to a selection result of the user interface processing.

A program according to the present technology causes an information processing device to execute user interface processing of enabling selection of whether or not to curb at least a part of sound generated in a first period from a power-on state until issuance of a transition instruction to a power-off state and a second period from the issuance of the transition instruction until the power-on state, and switching processing of changing control related to sound according to a selection result of the user interface processing.

As a result, it is possible to provide an optimal user interface for curbing sound generated by an imaging device.

BRIEF DESCRIPTION OF DRAWINGS

FIG. 7 is an example of a shutter/camera shake correction menu screen.

FIG. 8 is an example of an AF menu screen.

MODE FOR CARRYING OUT THE INVENTION

Hereinafter, an embodiment will be described in the following order.
<1. Configuration of imaging device>
<2. Functional configuration of camera control unit>
<3. First period and second period>
<4. User interface screen>
<4-1. Individual setting screen>
<4-2. Collective setting screen>
<5. Automatic switching processing>
<5-1. Automatic switching by subject>
<5-2. Automatic switching by scene specification>
<5-3. Automatic switching by silence>
<5-4. Focus control and automatic switching>
<6. Automatic switching at time of lens replacement>
<7. Processing flow>
<8. Modification>
<9. Summary>
<10. Present technology>

1. Configuration of Imaging Device

A configuration example of an imaging device 1 of an embodiment will be described with reference to FIGS. 1, 2, and 3.

As the imaging device 1, there are various forms of imaging devices as a video camera or a still camera. In the following description, the imaging device 1 to which an interchangeable lens barrel is attached will be described as an example.

Figure 1:
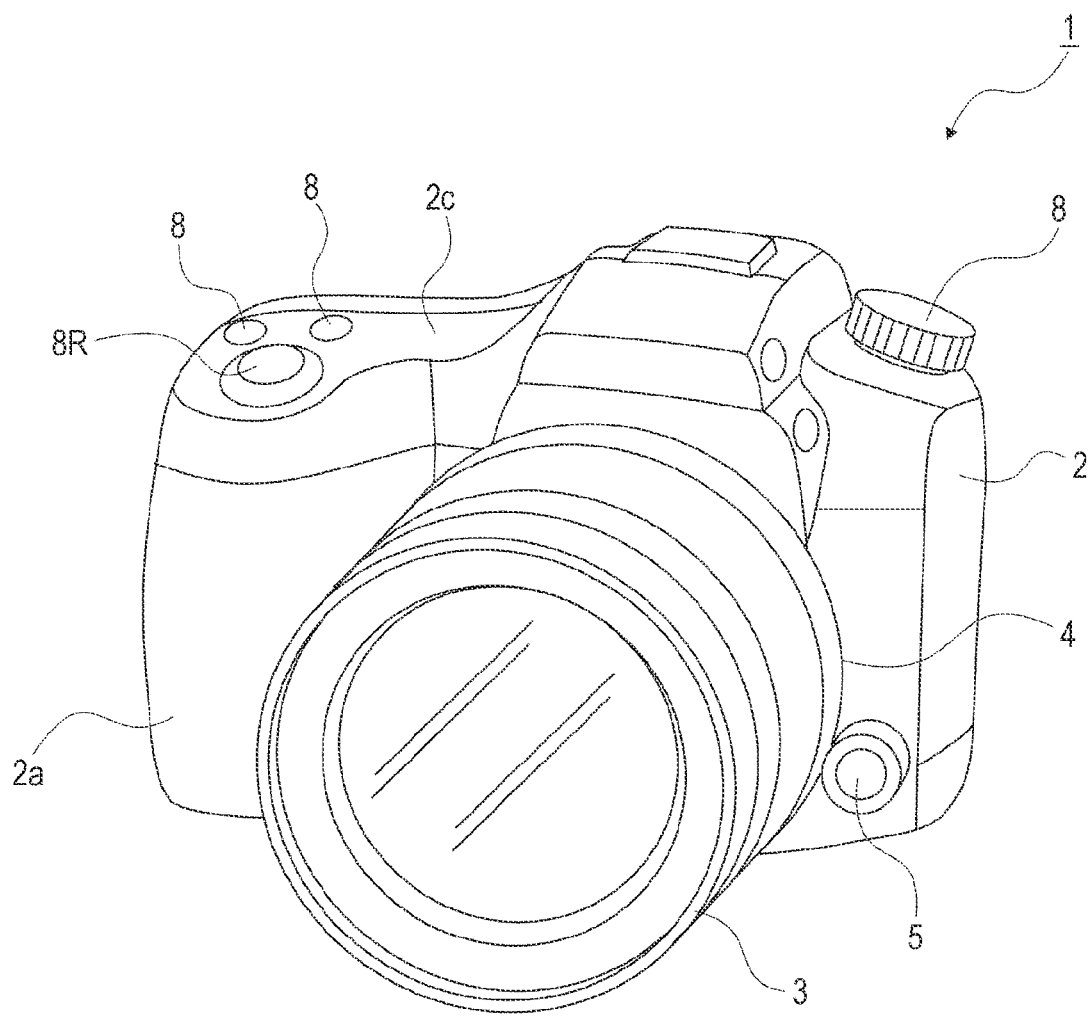
FIG. 1 is a perspective view of an imaging device according to an embodiment of the present technology.

As illustrated in FIG. 1, the imaging device 1 includes a main body 2 and a lens barrel 3 attached to the front (subject side) of the main body 2.

In the main body 2, an attaching part 4 for attaching the lens barrel 3 is formed on a front surface 2a, and a detaching button 5 for detaching the lens barrel 3 from the main body 2 is provided near the attaching part 4.

Figure 2:
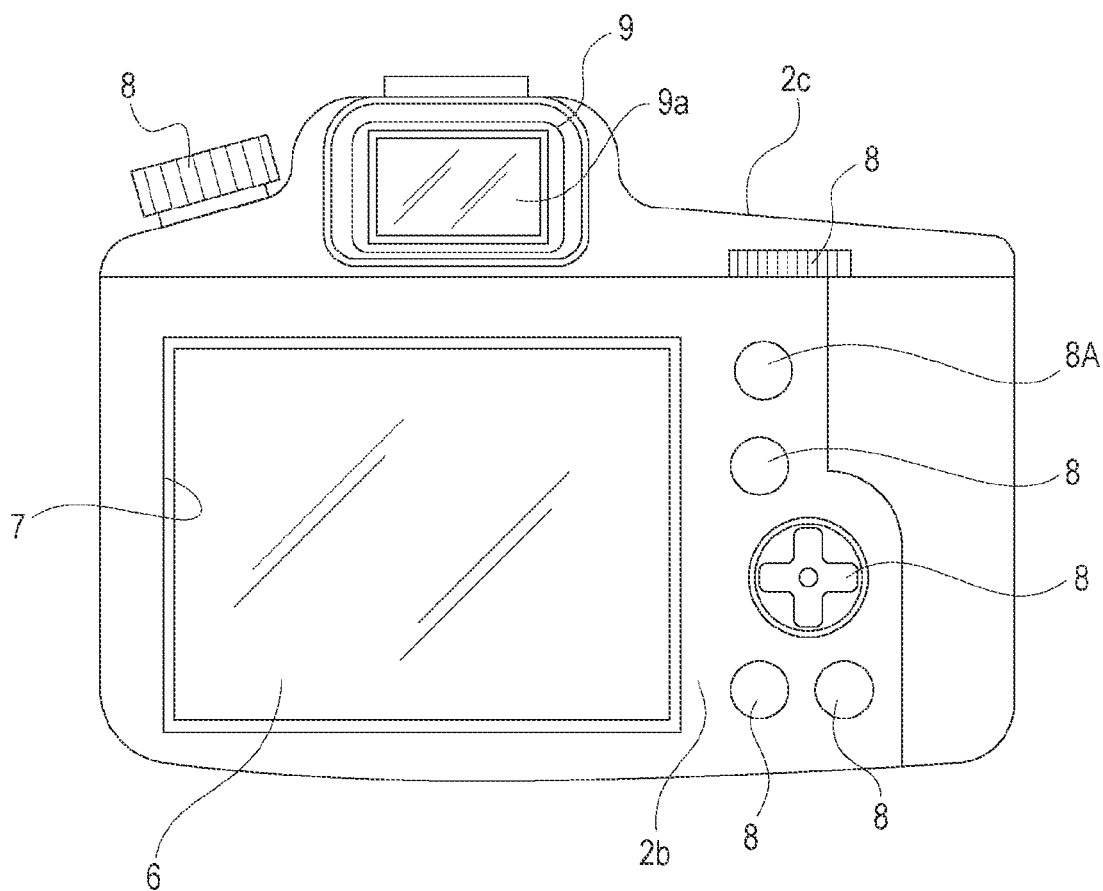
FIG. 2 is a rear view of the imaging device.

As illustrated in FIG. 2, a rear monitor 6 on which a captured image, a menu screen, and the like are displayed is attached to the back of the main body 2. A housing recess 7 for housing the rear monitor 6 is formed in a rear surface 2b of the main body 2.

The rear monitor 6 may be rotatable with respect to the main body 2 with the upper end or left and right ends serving as a rotation axis.

Various operation elements 8 are provided on the front surface 2a, the rear surface 2b, and an upper surface 2c of the main body 2. As the operation element 8, for example, a menu button, an enter button, a cancel button, a release button 8R, an assignable button 8A, and the like are provided. In addition, the operation element 8 is provided in in various forms such as a key, a dial, and a combined press/rotation operator in the main body 2 and the lens barrel 3 to achieve various operation functions. As control functions, for example, a menu operation, a playback operation, a mode selection operation, a focus operation, a zoom operation, a selection operation of parameters such as shutter speed and F value (F-number) can be performed.

While details of each operation element 8 are omitted, the release button 8R is used for a release operation (shutter operation) or an AF (autofocus) operation by half-pressing. Additionally, the assignable button 8A is an operation element to which a function or the like frequently used by the user can be assigned, and is an operation element whose behavior at the time of pressing can be customized.

In the rear surface 2b of the main body 2, a finder 9 is provided above the rear monitor 6. The finder 9 is provided with a finder monitor 9a.

Figure 3:
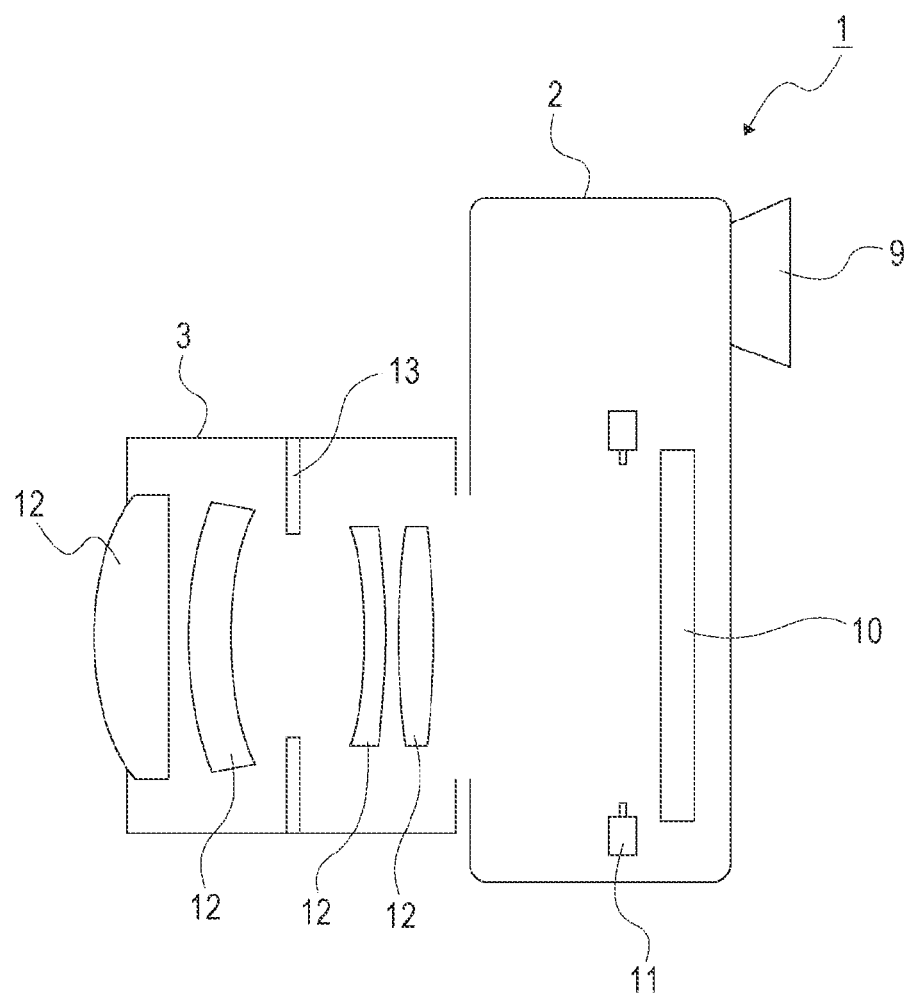
FIG. 3 is a schematic cross-sectional view of the imaging device.

As illustrated in FIG. 3, a complementary metal oxide semiconductor (CMOS) or charge coupled device (CCD) image sensor 10, a mechanical shutter mechanism 11, and the like are arranged in the internal space of the main body 2. Additionally, a mirror, a pentaprism, or the like (not illustrated) may be arranged in the internal space of the main body 2.

The finder monitor 9a may be configured to enable checking of the subject by displaying image data captured by the image sensor 10, or may be configured to enable checking of the subject by forming the finder 9 as an optical finder and receiving light through a mirror and a pentaprism.

Various optical lenses 12 such as an incident end lens, a zoom lens, a focus lens, and a condenser lens and a diaphragm mechanism 13 are arranged inside the lens barrel 3.

Figure 4:
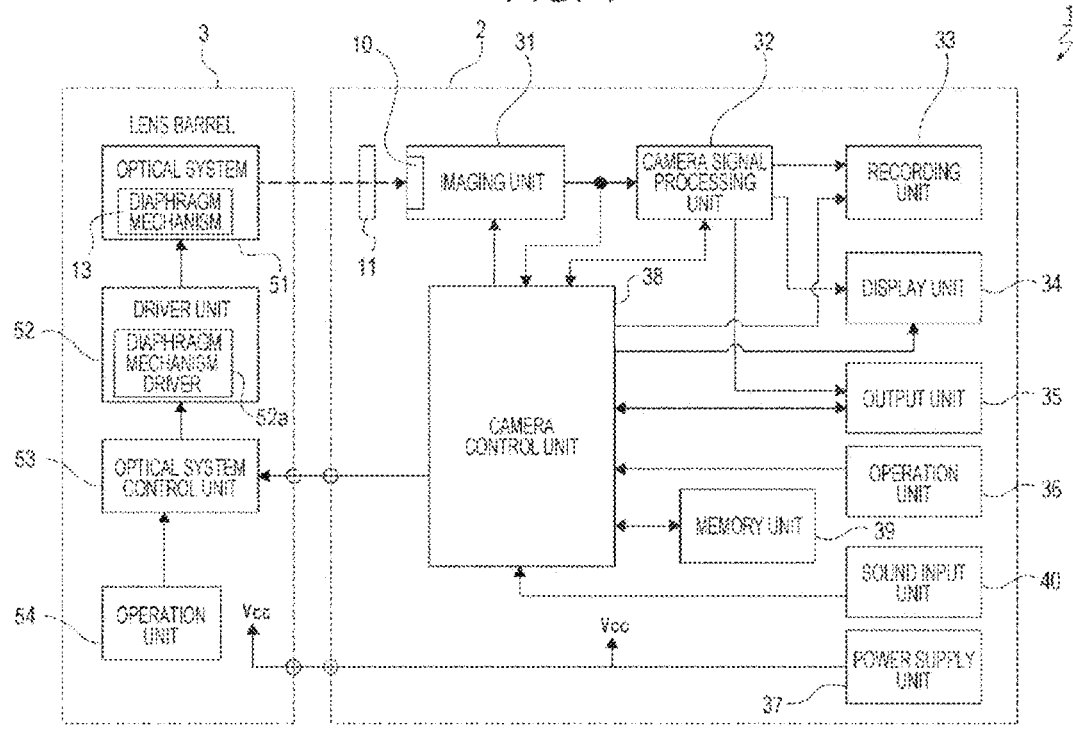
FIG. 4 is a block diagram of the imaging device.

FIG. 4 is a block diagram of the imaging device 1.

The mechanical shutter mechanism 11, an imaging unit 31, a camera signal processing unit 32, a recording unit 33, a display unit 34, an output unit 35, an operation unit 36, a power supply unit 37, a camera control unit 38, a memory unit 39, a sound input unit 40, and the like are provided inside and outside the main body 2 of the imaging device 1.

The lens barrel 3 includes an optical system 51, a driver unit 52, an optical system control unit 53, an operation unit 54, and the like.

The optical system 51 is the optical lens 12, the diaphragm mechanism 13, and the like.

The imaging unit 31 includes the image sensor 10. A sensor surface of the image sensor 10 includes a sensing element in which a plurality of pixels is two-dimensionally arranged.

For example, the imaging unit 31 performs, on an electric signal obtained by performing photoelectric conversion on light received by the image sensor 10, correlated double sampling (CDS) processing, automatic gain control (AGC) processing, and the like, and also analog/digital (A/D) conversion processing. The imaging unit 31 outputs a captured image signal as digital data to the camera signal processing unit 32 and the camera control unit 38.

The camera signal processing unit 32 includes, for example, a microprocessor specialized in digital signal processing such as a digital signal processor (DSP), a microcomputer, or the like.

The camera signal processing unit 32 includes units for performing various types of signal processing on the digital signal (captured image signal) transmitted from the imaging unit 31.

Specifically, the camera signal processing unit 32 performs processing such as correction processing among R, G, and B color channels, white balance correction, aberration correction, and shading correction.

Additionally, the camera signal processing unit 32 performs YC generation processing of generating (separating) a luminance (Y) signal and a color (C) signal from the image data of R, G, and B, processing of adjusting luminance and color, processing such as knee correction and gamma correction, and the like.

Moreover, the camera signal processing unit 32 performs conversion into a final output format by performing resolution conversion processing, codec processing of performing coding for recording or communication, and the like. The image data converted into the final output format is stored in the memory unit 39. Additionally, by outputting the image data to the display unit 34, the image is displayed on the rear monitor 6 or the finder monitor 9a. Moreover, by outputting the image data through an external output terminal, the image is displayed on a device such as a monitor provided outside the imaging device 1.

The recording unit 33 includes a non-volatile memory, for example, and functions as storage means that stores image files (content files) such as still image data and moving image data, attribute information of the image files, thumbnail images, and the like.

The image files are stored in formats such as joint photographic experts group (JPEG), tagged image file format (TIFF), and graphics interchange format (GIF).

The recording unit 33 can be implemented in various ways. For example, the recording unit 33 may be a flash memory built in the imaging device 1, or may be a memory card (e.g., portable flash memory) detachable from the imaging device 1 and an access unit that accesses the memory card for storage and reading. Additionally, the recording unit 33 may be implemented as a hard disk drive (HDD) as a form built in the imaging device 1, for example.

The display unit 34 performs processing for displaying various information for the image-capturing person. The display unit 34 is, for example, the rear monitor 6 or the finder monitor 9a. The display unit 34 performs processing of displaying the image data converted to an appropriate resolution input from the camera signal processing unit 32. As a result, a so-called through-the-lens image, which is a captured image during standby of the release, is displayed.

Moreover, the display unit 34 displays a graphical user interface (GUI) such as various operation menus, icons, messages, and the like on the screen according to instructions of the camera control unit 38.

Additionally, the display unit 34 can display a playback image of image data read from a recording medium in the recording unit 33.

Note that while both the rear monitor 6 and the finder monitor 9a are provided in the present example, the embodiment of the present technology is not limited to such a configuration, and it is possible to provide only one of the finder monitor 9a and the rear monitor 6, or to provide one or both of the finder monitor 9a and the rear monitor 6 in a detachable form.

The output unit 35 performs data communication and network communication with an external device by wire or wirelessly. For example, the output unit 35 transmits captured image data (still image files or moving image files) to an external display device, recording device, playback device, or the like.

Additionally, the output unit 35 may function as a network communication unit. For example, the output unit 35 may perform communication in various networks such as the Internet, a home network, and a local area network (LAN), and transmit and receive various data to and from a server, a terminal, and the like on the network.

The operation unit 36 provided in the main body 2 includes not only the above-described various operation elements 8, but also the rear monitor 6 adopting a touch panel system and the like, and outputs operation information corresponding to various operations such as a tap operation and a swipe operation of the image-capturing person to the camera control unit 38.

Note that the operation unit 36 may function as a reception unit of an external operation device such as a remote controller separate from the imaging device 1.

The power supply unit 37 generates a power supply voltage Vcc required for each unit from a battery loaded inside the power supply unit 37, and supplies the supply voltage Vcc as an operating voltage, for example.

When the lens barrel 3 is mounted on the main body 2, the power supply voltage Vcc of the power supply unit 37 is also supplied to a circuit inside the lens barrel 3.

Note that the power supply unit 37 may include a circuit for charging the battery or a circuit for generating the power supply voltage Vcc using, as the power supply, a DC voltage converted and input by an AC adapter connected to a commercial AC power supply.

The camera control unit 38 includes a microcomputer (arithmetic processing unit) including a central processing unit (CPU), and performs overall control of the imaging device 1. For example, the camera control unit 38 performs control of the shutter speed according to the operation of the image-capturing person, an instruction on various types of signal processing in the camera signal processing unit 32, an imaging operation and a recording operation according to the operation of the user, and a playback operation of the recorded image file.

Additionally, the camera control unit 38 instructs the optical system control unit 53 to control various lenses included in the optical system 51.

For example, the camera control unit 38 performs processing of designating an aperture value in order to secure a light amount necessary for AF control, an operation instruction of a diaphragm mechanism according to the aperture value, and the like.

Note that the camera control unit 38 is capable of implementing various functions described later. Details will be described later.

The memory unit 39 stores information or the like used for processing performed by the camera control unit 38. For example, the illustrated memory unit 39 comprehensively represents a read only memory (ROM), a random access memory (RAM), a flash memory, and the like.

The memory unit 39 may be a memory area built in a microcomputer chip as the camera control unit 38, or may be formed by a separate memory chip.

Programs and the like used by the camera control unit 38 are stored in the ROM, the flash memory, and the like of the memory unit 39. The ROM, the flash memory, and the like store, in addition to an operating system (OS) for the CPU to control units and content files such as image files, application programs for various operations, firmware, and the like.

The camera control unit 38 executes the program to control the entire imaging device 1.

The RAM of the memory unit 39 is used as a work area of the camera control unit 38 by temporarily storing data, programs, and the like used in various data processing performed by the CPU of the camera control unit 38.

The optical system control unit 53 of the lens barrel 3 includes, for example, a microcomputer, and outputs a control signal to the driver unit 52 to actually drive various lenses of the optical system 51 on the basis of an instruction from the camera control unit 38.

Note that information communication between the camera control unit 38 and the optical system control unit 53 may be enabled only in a state where the lens barrel 3 is mounted on the main body 2, or may be enabled by wireless communication in a state where the lens barrel 3 is not mounted on the main body 2.

For example, the driver unit 52 is provided with a motor driver for a zoom lens drive motor, a motor driver for a focus lens drive motor, a diaphragm mechanism driver 52a for a motor driving the diaphragm mechanism 13, and the like.

Each driver such as the diaphragm mechanism driver 52*a* supplies a drive current to the corresponding drive motor according to an instruction from the optical system control unit 53.

The operation unit 54 of the lens barrel 3 indicates the operation elements 8 provided on the side of the lens barrel 3. Operation information by the operation unit 54 is supplied to the optical system control unit 53, and the camera control unit 38 is notified of the operation information through the optical system control unit 53.

Operation control of the optical system 51 by the optical system control unit 53 and various settings and operation control by the camera control unit 38 are performed according to operations of the operation unit 54.

The operation unit 54 may function as a reception unit of an external operation device such as a remote controller separate from lens barrel 3.

2. Functional Configuration of Camera Control Unit

Figure 5:
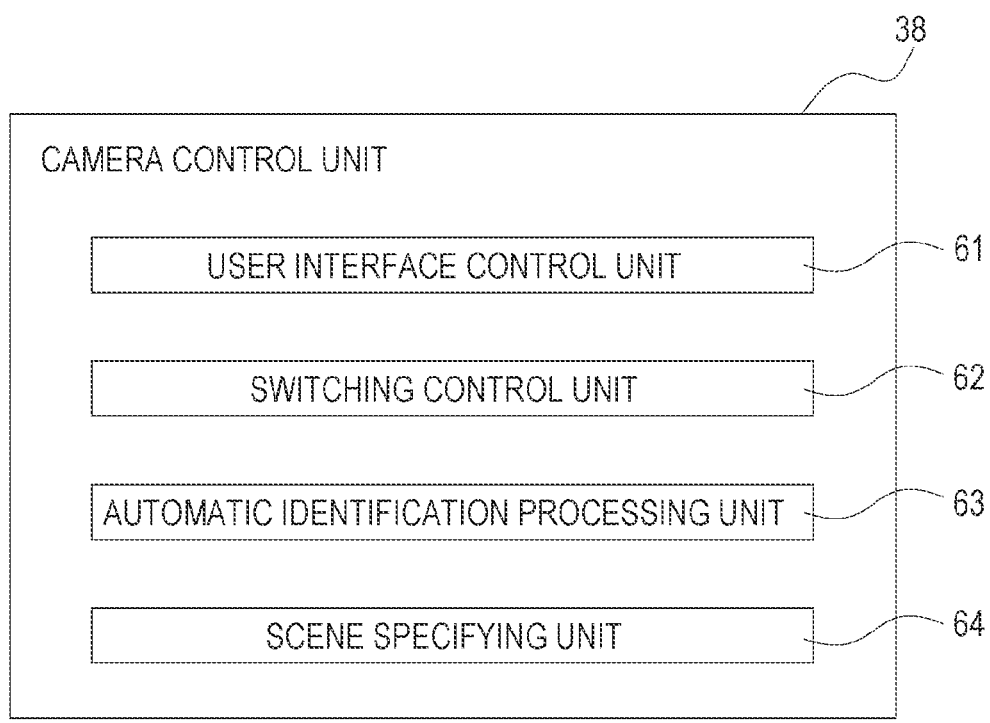
FIG. 5 is a diagram for describing a functional configuration of the imaging device.

In the camera control unit 38 of the imaging device 1, a functional configuration as illustrated in FIG. 5 is constructed by executing a program stored in the ROM or the RAM as the memory unit 39.

The camera control unit 38 includes a user interface control unit 61, a switching control unit 62, an automatic identification processing unit 63, and a scene specifying unit 64.

The user interface control unit 61 performs processing of detecting operations on the various operation elements 8 included in the imaging device 1 for the user, display processing using the display unit 34, processing of outputting sound and electronic sound, processing of providing an input operation environment to the user, and the like.

Additionally, in the present embodiment, the user interface control unit 61 provides an input operation environment for settings related to sound generated by the imaging device 1, such as a silent mode in particular.

Specifically, the user interface control unit 61 performs user interface processing for performing individual setting in order to curb various types of generated sounds. For example, user interface processing for selecting the shutter type is performed in order to curb the drive sound of the mechanical shutter mechanism 11 at the time of the release operation. Additionally, user interface processing for switching the presence or absence of electronic sound is performed in order to curb the electronic sound generated when the user operates the operation elements 8.

Alternatively, user interface processing for switching between on/off of auto pixel mapping is performed in order to curb the drive sound of the mechanical shutter mechanism 11 when auto pixel mapping is executed. The pixel mapping function is a function of specifying and storing a pixel having a defect due to collision of cosmic rays or the like. By storing the defective pixel, interpolation processing using peripheral pixels can be performed at the time of generating image data.

In addition to this, the user interface control unit 61 performs user interface processing for curbing generated sound. Details will be described later.

The switching control unit 62 performs switching control according to an operation performed by the user on the user interface presented by the user interface control unit 61. For example, in a case where an operation for changing the silent mode to "ON" is performed, a setting change for curbing various sounds generated by the imaging device 1 is performed. At this time, the setting may be changed on the basis of the content of detailed settings specified by the user. Details will be described later.

The automatic identification processing unit 63 performs processing of identifying (specifying) a subject in a captured image. For example, the subject may be identified by performing image recognition processing using a technology such as convolutional neural network (CNN), or the subject may be identified by using information input by the user regarding the subject.

The scene specifying unit 64 performs processing of specifying an imaging scene. An imaging scene may be, for example, a scene that specifies an action of the user, such as "wild bird observation" or "seeing an opera", or a scene that specifies the imaging location, such as "savanna" or "forest".

The imaging scene may be specified, for example, by performing image recognition processing using a technology such as CNN. Additionally, the imaging location may be specified using GPS information, or an event to be imaged may be specified using GPS information and time information.

Note that some or all of the above-described units may be provided in the camera signal processing unit 32. Additionally, some or all of the functions may be implemented by combining the camera control unit 38 and the camera signal processing unit 32. Some or all of the functions may be implemented by further combining the optical system control unit 53 of the lens barrel 3.

3. First Period and Second Period

A timing at which the user images or is about to image the subject and a timing other than the above are considered separately. In the present embodiment, the former is referred to as a "first period", and the latter is referred to as a "second period".

The first period is a period from when the power is turned on until a transition instruction to the OFF state is issued. Here, the transition instruction to the power-off state will be described.

The transition instruction to the power-off state is an instruction to power off the imaging device 1, and may be issued by the user or may be issued by the camera control unit 38.

First, a case where the user presses a power button as the operation element 8 with the intention of powering off the imaging device 1 will be considered. In this case, pressing of the power button by the user can be regarded as a transition instruction. Alternatively, various instructions that the camera control unit 38, which has detected that the user has pressed the power button of the imaging device 1, issues to each unit of the imaging device 1 to cause the power supply to transition from the ON state to the OFF state can be regarded as transition instructions.

Additionally, as another case, there is a case where the power is caused to transition automatically to the OFF state in order to curb power consumption when a time zone in which operation by the user is not detected extends to a predetermined time length. In such a case, various instructions that the camera control unit 38, which has detected that the user operation non-detection time length has reached the predetermined time, issues to each unit of the imaging device 1 to cause the power supply to transition from the ON state to the OFF state can be regarded as transition instructions.

Examples of sound that can be curbed among sounds generated by the imaging device 1 in the first period include the drive sound of the mechanical shutter mechanism 11 at the time of a release operation, the drive sound of the mechanical shutter mechanism 11 at the time of interval shooting, the drive sound of the diaphragm mechanism 13 in AF control, and electronic sound output when an operation on the operation element 8 is detected. Additionally, a drive sound of a mirror disposed in a case where the imaging device 1 includes an optical finder is also a sound generated in the first period.

On the other hand, examples of sound that can be curbed among sounds generated by the imaging device 1 in the second period include the operation sound of the mechanical shutter mechanism 11 generated after the above-described transition instruction is issued, the drive sound of the mechanical shutter mechanism 11 at the time of executing auto pixel mapping, and the like.

The drive sound of the mechanical shutter mechanism 11 after the transition instruction is generated to drive the mechanical shutter mechanism 11 to the closed state in order to protect the image sensor 10. Additionally, the drive sound of the mechanical shutter mechanism 11 at the time of executing auto pixel mapping is generated to drive the mechanical shutter mechanism 11 to the closed state in order to capture a black image.

The sounds generated in the first period are, in other words, sounds generated when the user is about to image the subject, and it is a matter of course that control is performed to curb these sounds when the silent mode is set.

On the other hand, the sounds generated in the second period are sounds generated at a timing when the user is not about to image the subject, and include sounds that are not necessarily curbed when the silent mode is set.

The imaging device 1 according to the present embodiment is characterized by performing control so as to curb not only sounds generated in the first period but also sounds generated in the second period when the silent mode is changed to ON.

Figure 6:
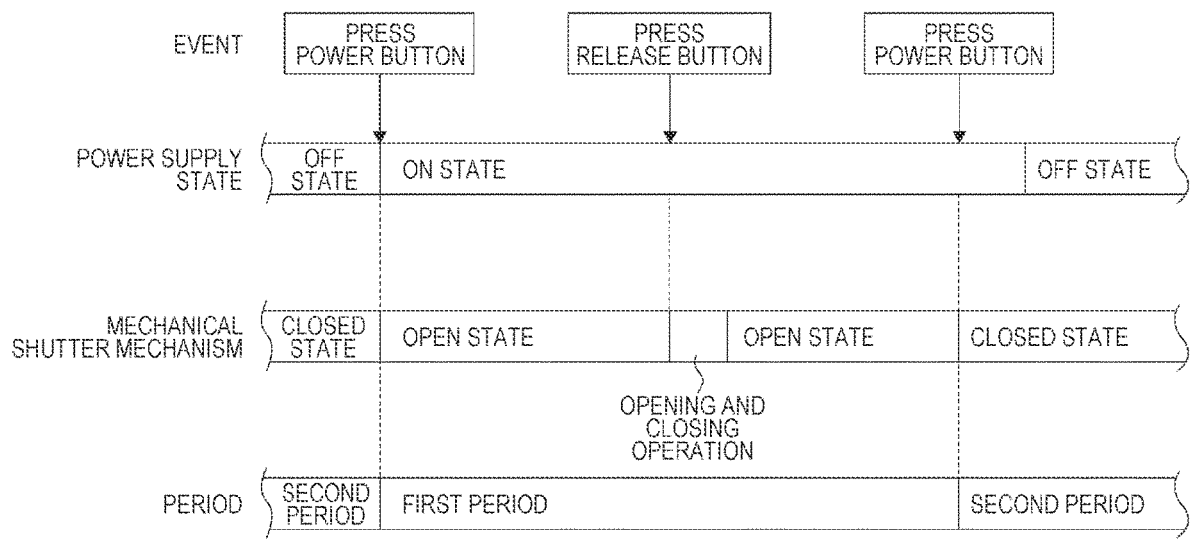
FIG. 6 is a diagram for describing a first period and a second period.

FIG. 6 is a diagram illustrating a relationship among an event such as a user operation, a power supply state, a state of the mechanical shutter mechanism 11, and the first and second periods. FIG. 6 illustrates a case where the silent mode is set to OFF.

As illustrated in the drawing, the first period is from when the power supply is turned on by the user pressing the power button until the power button is pressed again, which is regarded as an instruction to cause the power supply to transition to the OFF state. Additionally, the second period is a period from the above instruction until the power is turned on again.

4. User Interface Screen

A user interface screen displayed on the rear monitor 6 of the imaging device 1 will be described with reference to FIGS. 7 to 9.

<4-1. Individual Setting Screen>

First, a user interface screen that enables individual settings for curbing sound generation will be described.

FIG. 7 illustrates an example of a shutter/camera shake correction menu screen 81 that enables settings regarding the shutter type. On the shutter/camera shake correction menu screen 81, an item for selecting the shutter type is displayed together with various setting items.

The shutter type can be selected from among "auto", "mechanical shutter", and "electronic shutter". FIG. 7 illustrates a state in which "auto" is set.

In a case where "auto" is selected, for example, the mechanical shutter mechanism 11 and the electronic shutter are switched automatically according to the imaging mode or the imaging scene. An electronic shutter is a method of resetting the charge amount obtained by photoelectric conversion in the image sensor 10 instead of driving the front curtain of the mechanical shutter mechanism 11, and reading out the charge amount instead of driving the rear curtain of the mechanical shutter mechanism 11. In a case where the electronic shutter is used, the mechanical shutter mechanism 11 is not driven, so that the drive sound is curbed.

In a case where the "mechanical shutter" is selected, the mechanical shutter mechanism 11 is driven at the time of capturing a still image or the like.

In a case where the "electronic shutter" is selected, the electronic shutter is driven at the time of capturing a still image or the like. The user can curb the drive sound of the mechanical shutter mechanism 11 by selecting "electronic shutter" as the shutter type.

Note that as the shutter type at the time of an interval, the same shutter type may be selected automatically on the basis of the selection of the shutter type illustrated in FIG. 7, or an item for setting the shutter type at the time of the interval may be provided separately.

Next, FIG. 8 illustrates an example of an AF menu screen 82 that enables setting of the diaphragm driving method at the time of AF. On the AF menu screen 82, an item for selecting the diaphragm driving method at the time of AF is displayed together with various setting items regarding the AF function.

The diaphragm driving method at the time of AF can be selected from among "standard", "focus priority", and "silence priority". FIG. 8 illustrates a state in which "standard" is selected.

"Focus priority" is an option for prioritizing the autofocus performance, and control is performed to keep focusing on the subject by continuing to drive the diaphragm mechanism 13.

"Silent priority" is an option for minimizing the driving of the diaphragm mechanism 13 (or maintaining certain open state without driving). Since there is less driving of the diaphragm mechanism 13, generation of sound can be curbed.

"Standard" is an option for performing intermediate control between "focus priority" and "silence priority", and the drive sound of the diaphragm mechanism 13 can be curbed more than when "focus priority" is selected.

Figure 9:
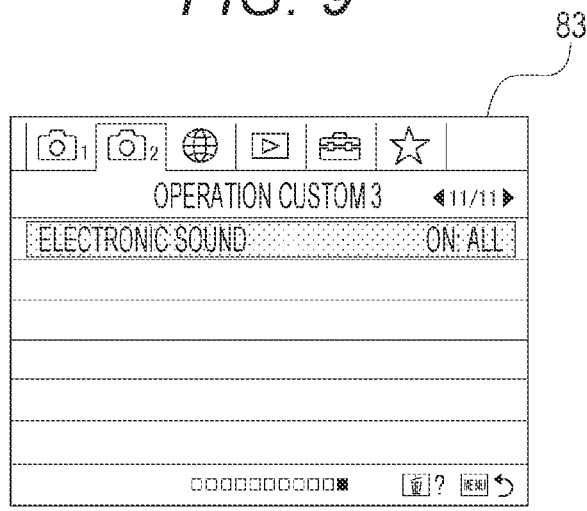
FIG. 9 is an example of a custom menu screen.

Next, FIG. 9 illustrates an example of a custom menu screen 83 that enables a setting regarding an electronic sound output when an operation is performed on the operation element 8. The custom menu screen 83 is provided with an item for turning on/off the output of the electronic sound.

"ON" and "OFF" are selectable as the output of the electronic sound. In a case where "ON" is selected, an electronic sound is output every time the operation element 8 is operated, and the user is notified that the operation has been accepted. A dedicated electronic sound may be output in a case where the operation performed by the user is an invalid operation.

In a case where "OFF" is selected, no electronic sound is output when the operation element 8 is operated. That is, output of the electronic sound when the operation element 8 is operated is curbed.

FIG. 9 illustrates a state where a setting in which all the electronic sounds can be output is selected. Regarding the output of the electronic sound, an option of outputting only some of the electronic sounds may be provided in addition to the above-described "ON" and "OFF".

In addition to those described with reference to FIGS. 7, 8, and 9, a user interface screen for curbing sound generated by the imaging device 1 in the second period may be presented.

Specifically, a user interface screen that enables selection of whether or not to drive the mechanical shutter mechanism 11 when the imaging device 1 transitions from the power-on state to the power-off state may be presented.

Additionally, a user interface screen that enables selection of whether or not the imaging device 1 automatically activates pixel mapping may be presented.

Each of these user interface screens is a screen that enables individual setting of the setting items.

<4-2. Collective Setting Screen>

Each item described in FIGS. 7, 8, and 9 is an item for curbing sound generated by the imaging device 1 in the first period.

Here, a menu screen that enables setting for collectively curbing sound generated by the imaging device 1 in the first and second periods will be described.

Figure 10:
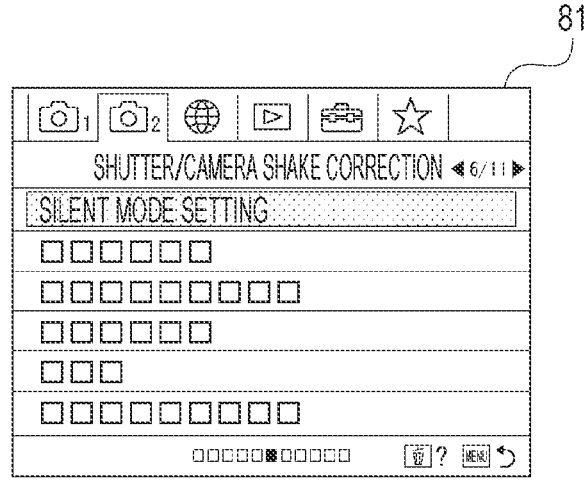
FIG. 10 is an example of a shutter/camera shake correction menu screen.

FIG. 10 is an example of the shutter/camera shake correction menu screen 81. On the shutter/camera shake correction menu screen 81, a "silent mode setting item" is displayed as an item for changing the setting regarding the silent mode.

Figure 11:
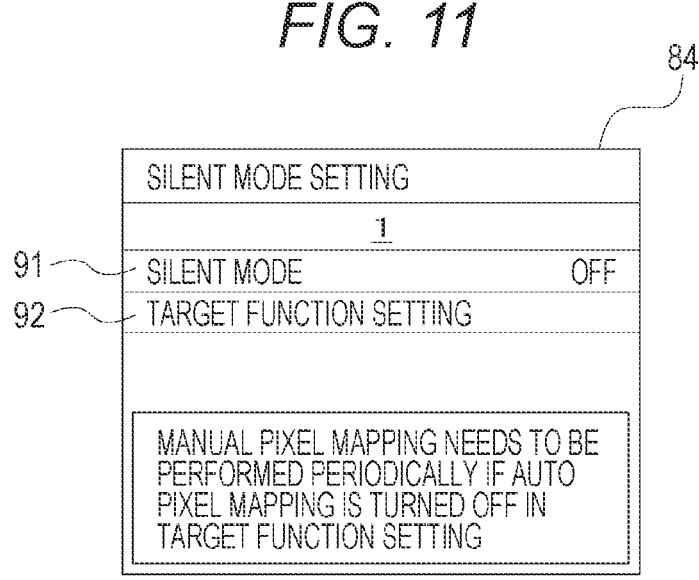
FIG. 11 is an example of a silent mode setting screen.

When the silent setting item is selected, a silent mode setting screen 84 illustrated in FIG. 11 is displayed.

The silent mode setting screen 84 displays a switching item 91 for turning on/off the silent mode and a target function setting item 92 for individually setting each item set as a setting target in the silent mode.

The switching item 91 functions as the operation element 8 in the rear monitor 6 adopting, for example, a touch panel system, and can switch ON/OFF of the silent mode when operated. Additionally, the switching item 91 functions as a notification unit for giving notification of the current state of the silent mode. That is, the user can recognize that the silent mode is turned off by viewing the silent mode setting screen 84 illustrated in FIG. 11.

Figure 12:
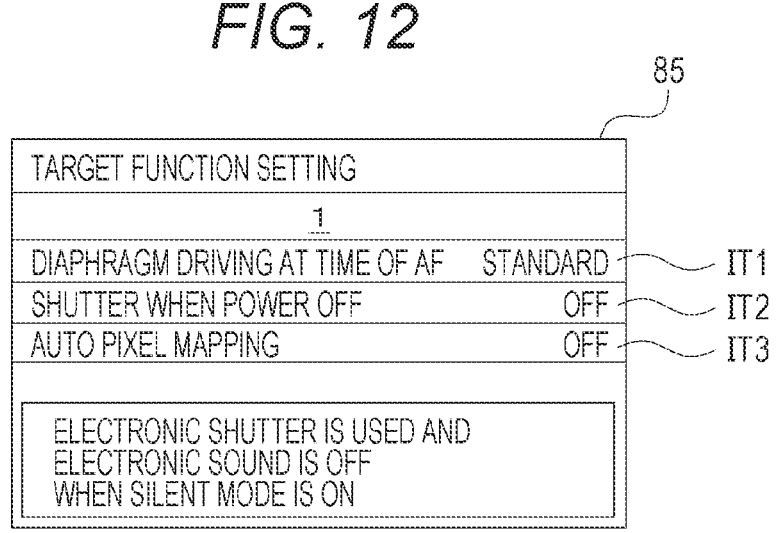
FIG. 12 is an example of a target function setting screen.

When the target function setting item 92 is selected, a target function setting screen 85 illustrated in FIG. 12 is displayed.

The target function setting screen 85 displays an item IT1 that enables selection of the diaphragm driving method at the time of AF, an item IT2 that enables selection of whether or not to drive the mechanical shutter mechanism 11 at the time of power-off, and an item IT3 that enables selection of whether or not to automatically perform pixel mapping.

The item IT1 is an item for curbing sound generated by the imaging device 1 in the first period. The items IT2 and IT3 are items for curbing sound generated by the imaging device 1 in the second period.

In the item IT1, for example, regarding the diaphragm driving method at the time of AF, items other than "focus priority" can be selected from among "standard", "focus priority", and "silence priority". That is, it is possible to select whether to select "standard" to slightly curb the drive sound of the diaphragm mechanism 13 or to select "silence priority" to greatly curb the drive sound of the diaphragm mechanism 13.

In a case where "silence priority" is selected, the continuous shooting speed and the AF speed (focusing speed) are limited, but the drive sound of the diaphragm mechanism 13 can be greatly curbed. This is particularly advantageous in the case of a large diaphragm mechanism 13 included in the lens barrel 3 or the like having high telephoto performance.

Note that when "silence priority" is selected, the user may be notified that there are restrictions on the continuous shooting speed and the AF speed. By providing such information to the user, the user can select a more optimal setting.

In the item IT2, when the imaging device 1 transitions from the power-on state to the power-off state, an "OFF" option of keeping the mechanical shutter mechanism 11 open without driving the mechanical shutter mechanism 11 and an "ON" option of closing the mechanical shutter mechanism 11 by driving the mechanical shutter mechanism 11 are selectable.

By selecting "OFF" in the item IT2, the drive sound of the mechanical shutter mechanism 11 can be curbed. For example, in a case of imaging of wild birds and the like, when the user determines that there is no photo opportunity for a while and powers off the imaging device 1, it is possible to prevent scaring away a wild bird nearby that the user is not aware of by the drive sound of the mechanical shutter mechanism 11.

Note that in a case where "ON" is selected in the item IT2, the mechanical shutter mechanism 11 can be deployed to protect the image sensor 10.

In the item IT3, an "ON" option for automatically activating pixel mapping and an "OFF" option for not automatically activating pixel mapping can be selected. When the auto pixel mapping function is set to "OFF", the mechanical shutter mechanism 11 is not driven, so that it is possible to curb generation of the drive sound.

On the other hand, when the auto pixel mapping function is set to "ON", the mechanical shutter mechanism 11 is driven periodically at a predetermined timing to execute the pixel mapping function. As a result, it is possible to prevent deterioration of image data due to a defect of the image sensor 10.

The combination of the selections in the items displayed on the target function setting screen 85 is applied when the silent mode is changed to ON on the silent mode setting screen 84 of FIG. 11. That is, once the user sets the behavior of various functions when the silent mode is changed to ON on the target function setting screen 85 in FIG. 12, thereafter, it is possible to collectively switch a plurality of items to a desired state only by performing an operation of switching ON/OFF of the silent mode.

The notification display on each screen will be described.

The silent mode setting screen 84 of FIG. 11 displays a notification "Manual pixel mapping needs to be performed periodically if auto pixel mapping of target function is turned off". Since pixel mapping is a function of compensating for deterioration of the image sensor 10, it is desirable to periodically execute pixel mapping. By giving this notification, the user is urged to periodically execute the manual pixel mapping function, and it is possible to prevent deterioration in image quality based on deterioration of the image sensor 10.

The target function setting screen 85 of FIG. 12 displays a notification "Electronic shutter is used and electronic sound is off when silent mode is on" below the item IT3.

This notification is for notifying the user of an item whose setting is forcibly changed when the silent mode is changed to ON. When only the items IT1, IT2, and IT3, which are items that can be set by the user, are displayed, there is a possibility of erroneously recognizing that there is no change in items (functions) that are not displayed. As illustrated in FIG. 12, by notifying the user of the change contents of the items that are changed when the silent mode is changed to ON and cannot be changed by the user, the user can correctly recognize the setting situation of the imaging device 1.

Note that in the present example, when the silent mode is changed to ON, the drive sound of the mechanical shutter mechanism 11 and the operation sound of the operation element 8 according to the release operation are forcibly changed to be curbed.

5. Automatic Switching Processing

The imaging device 1 according to the present embodiment performs processing of automatically switching the silent mode. The automatic switching processing is performed on the basis of some conditions. A specific description will be given.

<5-1. Automatic Switching by Subject>

A first example is automatic switching processing by the subject. Specifically, in a case where imaging is performed using the imaging device 1, automatic switching is performed by performing image recognition processing on an image captured by the imaging device 1.

Image recognition processing is performed using CNN, for example. That is, the automatic identification processing unit 63 performs image recognition on the captured image by using the CNN technology and specifies the subject.

After the subject is specified, the camera control unit 38 of the imaging device 1 determines whether or not the silent mode should be set.

For example, in a case where it is determined that the subject is a wild bird, an animal, or the like whose photo opportunity is likely to be ruined by sound generated by the imaging device 1, the silent mode is automatically set to ON.

As a result, it is possible to prevent the user from missing a photo opportunity when the user forgets to turn on the silent mode, or from missing a sudden photo opportunity.

<5-2. Automatic Switching by Scene Specification>

A second example is processing of automatically switching the silent mode by specifying the imaging scene.

For example, depending on the imaging scene, it may be better to curb sound generated by the imaging device 1 as much as possible. Specifically, there are imaging scenes of wild birds and animals described in the first example, and imaging scenes such as operas and songs in which there is a target that the surrounding people want to pay attention to without losing concentration.

The type of the current imaging scene is determined from aforementioned image recognition processing, GPS data, acquired voice data, and the like.

Then, as a result of analyzing the imaging scene, if it is determined that it is desirable to set the silent mode to ON, the camera control unit 38 performs processing of automatically setting the silent mode to ON.

As a result, even in an imaging scene in which it is not preferable to generate a sound from the imaging device 1, the generation (or volume) of the sound is automatically curbed, and the operation burden on the user can be reduced.

Note that the imaging device 1 may specify both the subject and the imaging scene, and may automatically switch the silent mode according to the specification results of both the subject and the imaging scene.

<5-3. Automatic Switching by Silence>

The imaging device 1 includes the sound input unit 40, and can measure the level of the sound input from the sound input unit 40.

Sound generated by the imaging device 1 is more conspicuous in a quiet environment. Therefore, in a third example, in a case where the sound input from the sound input unit 40 is lower than a predetermined level, the silent mode is automatically set to ON.

As a result, it is possible to reduce the possibility that the sound generated by the imaging device 1 becomes conspicuous in a quiet environment.

Note that several determination methods are conceivable. For example, the silent mode may be set to ON in a case where the maximum volume is smaller than a predetermined level, or the silent mode may be set to ON when the average volume in the latest predetermined period is smaller than a predetermined level.

Specifically, the silent mode may be changed to ON in a case where the average volume in the latest predetermined period is smaller than 40 dB.

<5-4. Focus Control and Automatic Switching>

In a fourth example, the silent mode is automatically switched when focus control is detected.

For example, the release operation is recognized by pushing (fully pushing) the release button 8R to the final position. On the other hand, so-called half-pressing is performed to keep the release button 8R pressed to a position before the final position, which is recognized as a focusing operation.

In a case where the user performs the focusing operation, it is assumed that the release operation is subsequently performed. In such a case, the silent mode may be automatically set to ON.

As a result, the user can simultaneously perform the operation of creating the in-focus state and the operation of setting the silent mode to ON, so that convenience can be improved.

Additionally, it may be possible to set whether or not to automatically set the silent mode to ON when the release button 8R is half-pressed. As a result, the functions can be customized according to the use mode of the user, and convenience can be further improved.

Each of the above-described examples may be used alone to automatically switch the silent mode, or a plurality of conditions may be determined in combination to automatically switch the silent mode.

Note that in the first to fourth examples described above, instead of automatically setting the silent mode to ON, user interface processing for selecting whether or not to set the silent mode on the screen may be performed to prevent forgetting to set the silent mode to ON. As a result, it is possible to prevent the silent mode from being automatically set to ON by mistake when it is not necessary.

Additionally, the accuracy of the automatic switching may be improved by storing in what situation the silent mode is turned on or turned off, and performing machine learning of the ON condition and the OFF condition of the silent mode from the information. In this case, the machine learning may be performed by the imaging device 1. Alternatively, data in which ON/OFF of the silent mode is associated with the imaging situation may be transmitted to a server device other than the imaging device 1 to accumulate the data in the server device, and the server device may be caused to perform analysis processing such as machine learning. By appropriately transmitting the result of learning and the result of analysis to the imaging device 1, optimal automatic switching processing can be performed in the imaging device 1. Additionally, these automatic switching processing can be adapted to the use mode for each user.

6. Automatic Switching at Time of Lens Replacement

There are cases where the lens barrel 3 mounted on the imaging device 1 is replaced according to the imaging scene or the like. In a state where the silent mode is turned on, the mechanical shutter mechanism 11 is not driven in order to avoid generation of sound as much as possible. Note, however, that if the mechanical shutter mechanism 11 is kept in the open state at the time of replacement of the lens barrel 3, the image sensor 10 may be exposed, dust may adhere to the image sensor 10, and performance of the pixel may be degraded, or the image sensor 10 may be damaged.

Therefore, even if the silent mode is set to ON, the mechanical shutter mechanism 11 is driven to be closed when the lens barrel 3 is replaced.

As a result, performance deterioration of the image sensor 10 is prevented.

For example, the lens barrel 3 is replaced by operating the detaching button 5 provided on the front surface 2a of the imaging device 1. Accordingly, the camera control unit 38 detects that the detaching button 5 has been operated, and drives the mechanical shutter mechanism 11 regardless of the state of the silent mode.

Note that there are other methods for detecting the replacement timing of the lens barrel 3. For example, replacement of the lens barrel 3 may be detected by detecting that the electrical connection between the lens barrel 3 and the main body 2 is interrupted, or replacement of the lens barrel 3 may be detected by detecting that the lens barrel 3 is rotated with respect to the attaching part 4 of the main body 2 after the detaching button 5 is pressed.

7. Processing Flow

Processing performed by the camera control unit 38 and the camera signal processing unit 32 of the imaging device 1 to implement the above-described various functions will be described with reference to FIGS. 13 and 14. Note that, in the following description, the camera control unit 38 and the camera signal processing unit 32 will be described as "processing unit" of the imaging device 1 without distinction. That is, each processing described below may be performed by the camera control unit 38, may be performed by the camera signal processing unit 32, or may be performed by cooperation of both the camera control unit 38 and the camera signal processing unit 32. Additionally, the image sensor 10 may perform a part of the image processing.

Figure 13:
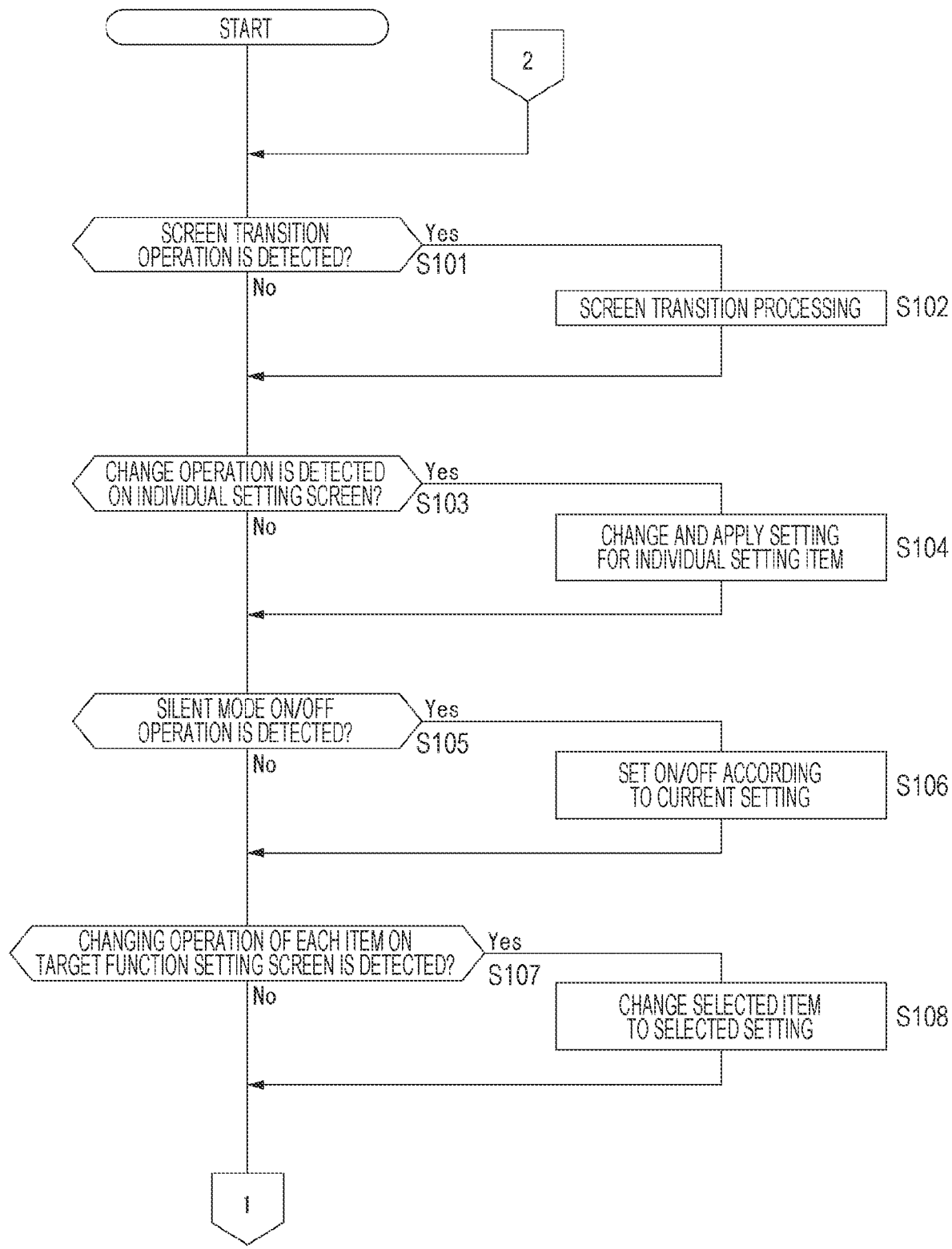
FIG. 13 is an example of a flowchart executed by a processing unit.
Figure 14:
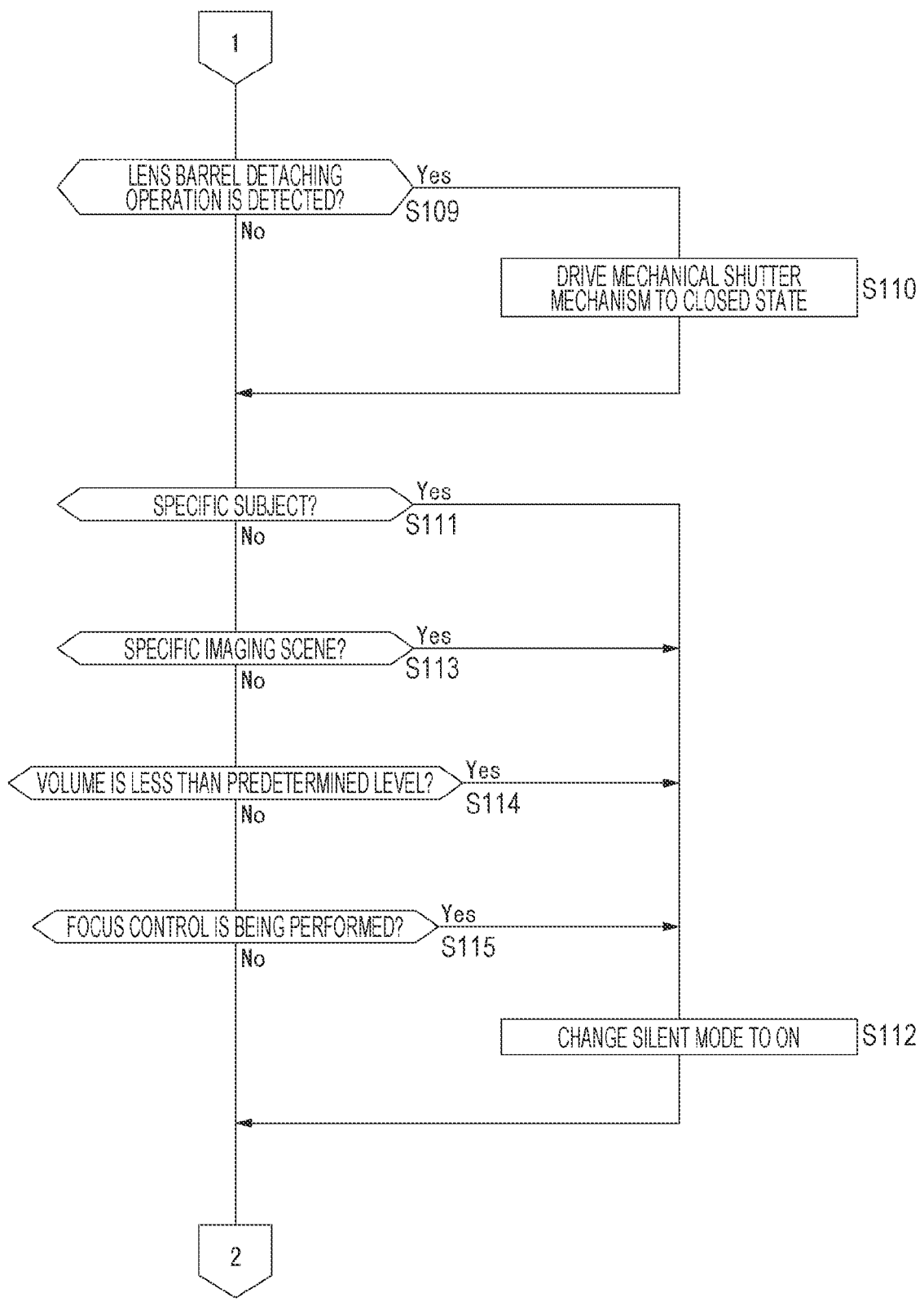
FIG. 14 is an example of a flowchart executed by the processing unit.

Note that the processing illustrated in FIGS. 13 and 14 is obtained by extracting processing for curbing sound generated by the imaging device 1, and is not all of processing performed by the imaging device 1.

First, in step S101, the processing unit determines whether or not a screen transition operation has been detected. A screen transition operation is performed, for example, by operating the operation element 8 such as a menu key or a cross-shaped key provided on the rear surface 2b of the imaging device 1.

If it is determined that the screen transition operation has been detected, the processing unit performs screen transition processing in step S102. Screen transition processing is performed according to the operation content of the detected operation. For example, in a case where an operation of selecting the target function setting item 92 is detected on the silent mode setting screen 84 illustrated in FIG. 11, screen transition processing to the target function setting screen 85 illustrated in FIG. 12 is performed.

If it is determined in step S101 that the screen transition operation has not been detected, or after the screen transition processing in step S102 is performed, the processing unit determines in step S103 whether or not a change operation on the individual setting screen has been detected.

A change operation on the individual setting screen is an operation of changing the shutter type on the shutter/camera shake correction menu screen 81 illustrated in FIG. 7, an operation of changing the diaphragm driving at the time of AF on the AF menu screen 82 illustrated in FIG. 8, an operation of switching ON/OFF of the electronic sound on the custom menu screen 83 in FIG. 9, and the like.

If it is determined that a change operation on the individual setting screen is detected, the processing unit performs processing of changing and applying the setting for the individual setting item in step S104. As a result, the item set by the user is changed.

On the other hand, if it is determined in step S103 that the change operation on the individual setting screen has not been detected, or after performing the change processing in step S104, the processing unit determines in step S105 whether or not the on/off operation of the silent mode has been detected.

The on/off operation of the silent mode is an operation on the switching item 91 on the silent mode setting screen 84 illustrated in FIG. 11.

If it is determined that the on/off operation of the silent mode is detected, the processing unit performs processing of turning on/off the silent mode according to the current setting in step S106. Specifically, when the silent mode is ON, it is changed to OFF, and when the silent mode is OFF, it is changed to ON.

If it is determined that the on/off operation of the silent mode is not detected, or after the on/off processing is performed in step S106, the processing unit determines in step S107 whether or not the changing operation of each item on the target function setting screen 85 (see FIG. 12) is detected.

If it is determined that the changing operation of each item is detected, the processing unit performs processing of changing the item selected in step S108 to the selected setting. For example, in a case where the diaphragm driving method at the time of AF is changed from "standard" to "silence priority", the driving control of the diaphragm mechanism 13 in the subsequent AF control is changed.

If it is determined in step S107 that no changing operation of an item is detected, or after the change processing of step S108 is performed, the processing unit proceeds to the branch processing of step 109 of FIG. 14.

In the branch processing of step S109, it is determined whether or not an operation of detaching the lens barrel 3 has been detected. If the detaching operation of the lens barrel 3 is detected, the processing unit performs processing of driving the mechanical shutter mechanism 11 to the closed state in step S110. As a result, the image sensor 10 is protected.

If it is determined in step S109 that the detaching operation of the lens barrel 3 has not been detected, or after the mechanical shutter mechanism 11 is driven to the closed state in step S110, the processing unit determines whether or not the subject captured in step S111 is a specific subject. A specific subject is, for example, a wild bird or an animal.

If the subject is determined to be the specific subject, the processing unit automatically changes the silent mode to ON in step S112.

After changing the silent mode to ON, the processing unit returns to the processing of step S101 again.

If it is determined that the subject is not the specific subject, the processing unit determines whether or not the imaging scene is a specific imaging scene in step S113. A specific imaging scene is, for example, a savanna in which an animal is assumed to be imaged, an opera in which sound output is not preferable, or the like.

If the scene is determined to be the specific imaging scene, the processing unit automatically changes the silent mode to ON in step S112.

If it is determined that the scene is not the specific imaging scene, the processing unit determines whether or not the volume is less than a predetermined level in step S113. If it is determined that the volume is less than the predetermined level, the processing unit automatically changes the silent mode to ON in step S112.

If it is determined that the volume is not less than the predetermined level, the processing unit determines whether or not focus control is being performed in step S115. If it is determined that focus control is being performed, the processing unit automatically changes the silent mode to ON in step S112.

After it is determined that the focus control is not being performed, the processing unit returns to the processing of step S101 again.

By repeatedly performing the determination processing of steps S101, S103, S105, S107, S109, S111, S113, S114, and S115, the imaging device 1 can constantly perform the determination processing as to whether or not to curb sound and the processing of curbing sound, and sound that is not preferable for the user can be prevented from being generated by the imaging device 1 at an unfavorable timing.

8. Modification

Some modifications will be described.

First, in a first modification, a silent mode or the like is set for an imaging device 1 by remote operation using a portable terminal device such as a smartphone or a tablet.

The user does not necessarily hold the imaging device 1 in his/her hand at the time of imaging. For example, the imaging device 1 may be installed in a place where it cannot be easily touched, such as near the ceiling. In such a case, it is inconvenient to set the silent mode to ON or OFF by operating the operation element 8 of the imaging device 1.

In the first modification, software is installed in a portable terminal device, and the setting of the imaging device 1 is changed by using the software. The software has a function of transmitting the selected setting to the imaging device 1.

As a result, various settings can be changed without touching the imaging device 1, and convenience can be improved.

Additionally, the software may have a function of receiving the current setting of the imaging device 1 from the imaging device 1. As a result, it is possible to change only the setting that needs to be changed while confirming the current setting, so that convenience can be further improved.

Next, in a second modification, ON and OFF of the silent mode are switched using an assignable button 8A.

As described with reference to FIG. 2, the assignable button 8A is provided on a rear surface 2b of an imaging device 1. The assignable button 8A is an operation element that can be independently customized by the user, and is an operation element to which an arbitrary function can be assigned.

In the second modification, a function of switching between ON and OFF of the silent mode is assigned to the assignable button 8A.

As a result, an operation of changing the silent mode from ON to OFF and an operation of changing from OFF to ON can be performed using the assignable button 8A.

Accordingly, since it is not necessary to switch the silent mode while displaying the menu screen on the rear monitor 6 or the like by operating the various operation elements 8, operability can be improved.

Additionally, it is also possible to assign an ON setting function instead of the silent mode switching function to the assignable button 8A. That is, regardless of whether the current setting of the silent mode is ON or OFF, the silent mode can be reliably set to ON by pressing the assignable button 8A.

As a result, it is possible to quickly change the silent mode to ON without worrying about the current setting, and thus, it is possible to improve convenience. Additionally, it is possible to prevent unintentional changing of the silent mode to OFF by pressing the assignable button 8A due to erroneous recognition that the silent mode is OFF even though the silent mode is currently ON. Thus, it is possible to eliminate the possibility of erroneous operation.

Finally, some examples will be described as other modifications.

While the individual setting screen for curbing generation of sound and the collective setting screen for the silent mode are provided separately in the above-described example, it is possible to provide only the collective setting screen. That is, the collective setting screen may be configured to also enable changes in individual settings for curbing generation of sound.

By collectively arranging the settings for curbing generation of sound in one place (same menu screen), the user can efficiently change the settings.

In a case where a mirror is disposed inside the imaging device 1, an item for curbing a drive sound for the mirror may be provided. For example, a setting for preventing the mirror from moving as much as possible, a setting for reducing the driving speed of the mirror, or the like may be selectable. By setting such items, sound generated by the imaging device 1 can be curbed even in the imaging device 1 including a mirror and a pentaprism.

Additionally, it is also possible to set the setting for curbing the drive sound generated by the mirror to the ON setting at the same time as when the silent mode is set to the ON setting. Additionally, whether or not to curb the drive sound of the mirror when the silent mode is set to ON may be selectable.

Additionally, in a case where the imaging device 1 includes a flash mechanism, sound generated when a flash function is used at the time of imaging may also be curbed. Sound generated when the flash function is used is, for example, a sound generated in the first period. For this sound, too, the setting may be changed so that the sound is automatically curbed when the silent mode is set to ON, or the user may be allowed to determine the behavior when the silent mode is set to ON.

Sound generated by the imaging device 1 includes sounds other than those described above. For example, in a case where a flash device attachable to the imaging device 1 is used, the sound is a drive sound of a zoom lens (or another optical lens 12) generated when the flash device is attached to the imaging device 1. In addition, a sound generated when a movable unit provided in the imaging device 1 moves, a sound output from a sound output unit, and the like are to be curbed in the silent mode described above.

These various generated sounds may be controlled so as to be automatically curbed when the silent mode is set to ON, or their behavior when the silent mode is set to ON may be selectable by the user.

While each of the above-described examples describes a configuration for curbing sound, the present invention can be applied to a configuration for curbing light. For example, a subject such as a wild bird may be scared off not only by sound but also by light.

In this manner, an element (not only sound but also light or the like) that may cause a photo opportunity for a subject to be missed may also be curbed (or changed) when the silent mode is set to ON. For example, even if the flash function is set to ON, when the silent mode is set to ON, the flash function may be automatically changed to OFF, so that the subject is not irradiated with light.

In addition to the flash, examples of light include light of the rear monitor 6 and LED used for various notifications. Such various kinds of light are automatically changed according to ON/OFF of the silent mode, whereby it is possible to prevent missing a photo opportunity.

In particular, by curbing generation of light in the second period, it is possible to greatly reduce the possibility of unintentionally missing a photo opportunity.

The drive sound of the mirror may be generated in both the first period and the second period. The above-described setting for the mirror may be curbed for the first period, or may be curbed for both the first period and the second period.

9. Summary

As described in each of the examples described above, the imaging device 1 includes the user interface control unit 61 that performs user interface processing of enabling selection of whether or not to curb at least a part of sound generated in the first period from the power-on state until issuance of the transition instruction to the power-off state and the second period from the issuance of the transition instruction until the power-on state.

The first period includes a time zone in which imaging is attempted with the subject captured in the angle of view. Additionally, the second period includes a time zone in which imaging of the subject is not attempted.

User interface processing is, for example, processing of presenting, to the user, a menu screen that enables selection from among "standard", "focus priority", and "silence priority" as the diaphragm driving method at the time of AF. Specific examples include the menu screen for individual setting illustrated in FIG. 7 and the target function setting screen 85 illustrated in FIG. 12 described above.

Alternatively, user interface processing is, for example, processing of presenting, to the user, a menu screen for selecting whether or not to automatically activate auto pixel mapping. Specific examples include the menu screen for individually setting the auto pixel mapping and the target function setting screen 85 illustrated in FIG. 12.

Alternatively, user interface processing is, for example, processing of presenting the silent mode setting screen 84 to the user. Alternatively, user interface processing may be processing of detecting an operation on the assignable button 8A to which the silent mode switching function is assigned.

Accordingly, in the user interface processing, it is possible to perform setting so as to curb sound generated both at the time of imaging and at the time of non-imaging.

By performing such various types of user interface processing, various means for performing setting to curb sound generated by the imaging device 1 can be presented to the user.

Additionally, the imaging device 1 includes the switching control unit 62 that changes control related to sound according to a selection result for the user interface processing.

As a result, it is possible to curb generation of sound at the time of imaging and at the time of non-imaging by a simple operation such as selection of one option, for example, and improve convenience of the user.

The user interface processing performed by the user interface control unit 61 may include processing of enabling selection of whether or not to curb at least a part of the sound generated in the first period.

As a result, a user interface for curbing the sound generated in the first period is provided to the user. Accordingly, the user can perform an operation for curbing the sound generated for the first period.

The user interface processing performed by the user interface control unit 61 may include processing of enabling selection of whether or not to curb at least a part of the sound generated in the second period.

As a result, a user interface for curbing the sound generated in the second period is provided to the user. Accordingly, the user can perform an operation for curbing the sound generated in the second period.

As described with reference to FIG. 7 and the like, the user interface processing may include presentation for selecting whether or not to curb the drive sound of the mechanical shutter mechanism 11 according to the release operation.

The drive sound of the mechanical shutter mechanism 11 according to the release operation is a sound generated in the first period. As a result, even when the option of turning on the sound curbing function (silent mode) is selected from the ON/OFF options of the sound curbing function presented in the user interface processing, the drive sound of the mechanical shutter mechanism 11 based on the release operation is curbed.

Accordingly, the possibility of scaring off a subject such as a wild bird or an animal can be reduced, and convenience can be improved.

As described with reference to FIG. 9 and the like, the user interface processing may include presentation for selecting whether or not to curb the operation sound of the operation element 8.

The operation sound of the operation element 8 includes a sound generated in the first period. As a result, even in a case where the option of turning on the sound curbing function (silent mode) is selected on the basis of the user interface processing, the operation sound such as an electronic sound is curbed.

Accordingly, the possibility of scaring off a subject such as a wild bird or an animal can be reduced, and convenience can be improved.

As described with reference to FIG. 8 and the like, the user interface processing may include presentation for selecting whether or not to curb the drive sound of the diaphragm mechanism 13 at the time of autofocus control.

The drive sound of the diaphragm mechanism 13 at the time of autofocus control is a sound generated in the first period. As a result, even when the option of turning on the sound curbing function (silent mode) is selected on the basis of the user interface processing, the drive sound of the diaphragm mechanism 13 at the time of autofocus control is curbed.

Accordingly, the possibility of scaring off a subject such as a wild bird or an animal can be reduced, and convenience can be improved.

As described above, the user interface processing may include presentation for selecting whether or not to curb the drive sound of the mechanical shutter mechanism 11 generated when the mechanical shutter is closed according to the transition instruction.

The sound generated when the mechanical shutter is closed according to the transition instruction to the power-off state is a sound generated in the second period. As a result, even when the option of turning on the sound curbing function (silent mode) is selected on the basis of the user interface processing, the drive sound of the mechanical shutter mechanism 11 at the time of transition to the power-off state is curbed.

For example, sound generation is curbed by not operating the mechanical shutter at the time of transition to the power-off state. As a result, the possibility of scaring off a subject such as a wild bird or an animal can be reduced, and convenience can be improved.

As described above, the user interface processing may include presentation for selecting whether or not to curb the drive sound of the mechanical shutter mechanism 11 in the auto pixel mapping function.

The drive sound of the mechanical shutter mechanism 11 in the auto pixel mapping function also includes a sound generated in the second period. As a result, even when the option of turning on the sound curbing function (silent mode) is selected on the basis of the user interface processing, the auto pixel mapping function is controlled not to operate.

Accordingly, the possibility of scaring off a subject such as a wild bird or an animal can be reduced, and convenience can be improved.

As described with reference to FIG. 12 and the like, the user interface processing may include presentation that enables setting of whether or not to curb sound for each type of sound generated in the first period and the second period.

As a result, whether or not the user curbs the sound can be customized for each type of sound.

Accordingly, setting can be made as intended by the user, and convenience can be improved.

As described with reference to FIG. 11 and the like, the user interface processing may include presentation of an operation element for setting details as to whether or not to curb the sound generated in the first period and the second period.

As a result, the operation element 8 for customizing whether or not the user curbs sound is provided.

Accordingly, various settings related to sound curbing are integrated, an operation burden on the user for the settings can be reduced, and convenience can be improved.

As described with reference to FIG. 12 and the like, in the detailed settings, the user interface control unit 61 may perform presentation that enables setting of a setting item as to whether or not to curb the drive sound of the diaphragm mechanism at the time of autofocus control, a setting item as to whether or not to curb the drive sound of the mechanical shutter mechanism 11 generated when the mechanical shutter is closed according to the transition instruction, and a setting item as to whether or not to curb the drive sound of the mechanical shutter mechanism 11 in the auto pixel mapping function.

As a result, various operations for customizing whether or not the user curbs sound can be performed on the detailed settings screen.

Accordingly, various settings related to sound curbing can be collectively performed, an operation burden on the user for the settings can be reduced, and convenience can be improved.

As described with reference to FIG. 12 and the like, the user interface control unit 61 may display an unchangeable item in the detailed settings.

As a result, the user can grasp the content of the current setting regarding sound curbing even for the unchangeable item.

Accordingly, it is not necessary to operate another menu or the like in order to grasp the content of the item that cannot be set, so that usability can be improved.

As described with reference to FIG. 12 and the like, the unchangeable item may include a setting item as to whether or not to curb the drive sound of the mechanical shutter mechanism 11 according to the release operation and a setting item as to whether or not to curb the operation sound of the operation element 8.

As a result, in a case where the option of turning on the sound curbing function (silent mode) is selected on the basis of the user interface processing, the drive sound and the operation sound of the mechanical shutter mechanism 11 according to the release operation are curbed, and the user can recognize the state.

Accordingly, usability can be improved.

As described in the section of the automatic switching by the subject, the imaging device 1 may include the automatic identification processing unit 63 that automatically identifies the subject, and the switching control unit 62 may perform control for curbing sound generated in the first period and the second period when the automatic identification processing unit 63 recognizes the subject as an organism.

An organism may be, for example, a wild bird, a wild animal, or the like, or may be a human.

As a result, the control of curbing sound and the control of not curbing sound are switched automatically according to the subject. Accordingly, since the user does not need to perform an operation of changing the setting according to the subject, convenience is improved. Additionally, since the imaging operation can be performed without performing an operation for sound curbing, it is possible to prevent an optimal imaging scene from being missed.

As described in the section of focus control and automatic switching, the switching control unit 62 may perform focus control and also perform control for curbing sound generated in the first period and the second period by a predetermined operation (e.g., half-pressing operation of release button 8R)

It is assumed that a timing at which focus control is performed is a timing at which the user is about to image the subject.

By automatically detecting such a timing and automatically switching to control for curbing sound, the user can quickly perform the imaging operation with the optimum imaging setting without operating a menu or the like.

As described in the section of automatic switching by scene specification, the imaging device 1 may include the scene specifying unit 64 that specifies the imaging scene, and the switching control unit 62 may perform control for curbing sound generated in the first period and the second period according to the specified imaging scene.

As a result, in a case where the current imaging scene is an imaging scene in which it is desirable not to generate sound related to imaging such as a musical performance or a concert, the control can be automatically switched to control for curbing sound.

Accordingly, the user can perform the imaging operation with the optimum imaging setting without operating a menu or the like. This is particularly advantageous for a scene where it is difficult to operate the menu screen such as a dark place in the venue.

As described in the section of automatic switching by silence, the imaging device 1 may include the sound input unit 40 to which a sound signal is input, and the switching control unit 62 may perform control for curbing sound generated in the first period and the second period in a case where the signal level of the sound signal input to the sound input unit 40 is equal to or less than a predetermined value.

The fact that the signal level of the sound signal input to the sound input unit 40 is equal to or less than the predetermined value indicates a quiet environment or the like. When sound is generated in such a case, the sound may stand out.

According to this configuration, it is possible to automatically detect a quiet environment and automatically switch to control for curbing sound. As a result, the user can quickly perform the imaging operation with the optimum imaging setting without operating a menu or the like, and convenience is improved.

As described in the section of automatic switching at the time of lens replacement, the imaging device 1 may include the attaching part 4 to which the lens barrel is attached, and when an operation for detaching the lens barrel 3 from the attaching part 4 is detected, the switching control unit 62 may perform control for closing the mechanical shutter even with the setting for curbing sound generated in the first period and the second period.

When lens barrel 3 is detached, dust or the like may adhere to the image sensor 10 or the like, and performance may be deteriorated. When the operation for detaching the lens barrel 3 is detected, the mechanical shutter is closed regardless of the sound curbing setting.

As a result, adhesion of dust and damage to the image sensor 10 is prevented. Accordingly, it is possible to prevent obstruction of the normal exposure operation of the image sensor 10.

A program of the embodiment is a program for causing a CPU, a DSP, and the like, or a device including the CPU and the DSP, to perform all or part of the processing illustrated in FIGS. 13 and 14.

That is, the program of the embodiment causes the processing unit (camera control unit 38 or camera signal processing unit 32) to perform the user interface processing that enables selection of whether or not to curb at least a part of the sound generated in the first period from the power-on state until issuance of the transition instruction to the power-off state and the second period from the issuance of the transition instruction until the power-on state.

Additionally, the processing unit (camera control unit 38 or camera signal processing unit 32) is caused to perform switching processing for changing control related to sound according to a selection result for the user interface processing.

With such a program, the above-described imaging device 1 can be implemented.

A program for implementing such an imaging device 1 can be recorded in advance in an HDD as a recording medium built in a device such as a computer device, a ROM in a microcomputer having a CPU, or the like.

Alternatively, the program can be stored (recorded) temporarily or permanently on a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Additionally, such a program can be installed from a removable recording medium to a personal computer or the like, or can be downloaded from a download site through a network such as a local area network (LAN) or the Internet.

Furthermore, such a program is suitable for providing the imaging device 1 of the embodiment in a wide range. For example, by downloading the program to a mobile terminal device such as a smartphone or a tablet, a mobile phone, a personal computer, a game device, a video device, a device including a camera function such as a personal digital assistant (PDA), or the like, the smartphone or the like can be caused to function as the imaging device 1 of the present disclosure.

Note that the effect described in the present specification is merely an example and is not limited, and other effects can be obtained.

10. Present Technology

The present technology can also adopt the following configurations.

(1)

An imaging device including:

a user interface control unit that performs user interface processing of enabling selection of whether or not to curb at least a part of sound generated in a first period from a power-on state until issuance of a transition instruction to a power-off state and a second period from the issuance of the transition instruction until the power-on state; and a switching control unit that changes control related to sound according to a selection result of the user interface processing.

(2)

The imaging device according to (1) above, in which the user interface processing includes processing of enabling selection of whether or not to curb at least a part of the sound generated in the first period.

(3)

The imaging device according to any one of (1) and (2) above, in which the user interface processing includes processing of enabling selection of whether or not to curb at least a part of the sound generated in the second period.

(4)

The imaging device according to any one of (1) to (3) above, in which the user interface processing includes presentation for selecting whether or not to curb a drive sound of a mechanical shutter mechanism according to a release operation.

(5)

The imaging device according to any one of (1) to (4) above, in which the user interface processing includes presentation for selecting whether or not to curb an operation sound of an operation element.

(6)
The imaging device according to any one of (1) to (5) above, in which
the user interface processing includes presentation for selecting whether or not to curb a drive sound of a diaphragm mechanism at a time of autofocus control.

(7)
The imaging device according to any one of (1) to (6) above, in which
the user interface processing includes presentation for selecting whether or not to curb a drive sound of a mechanical shutter mechanism generated when a mechanical shutter is closed according to the transition instruction.

(8)
The imaging device according to any one of (1) to (7) above, in which
the user interface processing includes presentation for selecting whether or not to curb a drive sound of a mechanical shutter mechanism in an auto pixel mapping function.

(9)
The imaging device according to any one of (1) to (8) above, in which
the user interface processing includes presentation that enables setting of whether or not to curb sound for each type of sound generated in the first period and the second period.

(10)
The imaging device according to any one of (1) to (9) above, in which
the user interface processing includes presentation of an operation element for setting details as to whether or not to curb sound generated in the first period and the second period.

(11)
The imaging device according to (10) above, in which
in the detailed settings, the user interface control unit performs presentation that enables setting of a setting item as to whether or not to curb a drive sound of a diaphragm mechanism at a time of autofocus control, a setting item as to whether or not to curb a drive sound of a mechanical shutter mechanism generated when a mechanical shutter is closed according to the transition instruction, and a setting item as to whether or not to curb a drive sound of the mechanical shutter mechanism in an auto pixel mapping function.

(12)
The imaging device according to any one of (10) and (11) above, in which
in the detailed settings, the user interface control unit displays an unchangeable item.

(13)
The imaging device according to (12) above, in which the unchangeable item includes a setting item as to whether or not to curb a drive sound of a mechanical shutter mechanism according to a release operation and a setting item as to whether or not to curb an operation sound of an operation element.

(14)
The imaging device according to any one of (1) to (13) above, further including
an automatic identification processing unit that automatically identifies a subject, in which
the switching control unit performs control for curbing sound generated in the first period and the second period when the automatic identification processing unit recognizes the subject as an organism.

(15)
The imaging device according to any one of (1) to (14) above, in which
the switching control unit performs focus control by a predetermined operation and also performs control for curbing sound generated in the first period and the second period.

(16)
The imaging device according to any one of (1) to (15) above, further including
a scene specifying unit that specifies an imaging scene, in which
the switching control unit performs control for curbing sound generated in the first period and the second period according to the specified imaging scene.

(17)
The imaging device according to any one of (1) to (16) above, further including
a sound input unit to which a sound signal is input, in which
the switching control unit performs control for curbing sound generated in the first period and the second period in a case where a signal level of the sound signal input to the sound input unit is equal to or less than a predetermined value.

(18)
The imaging device according to any one of (1) to (17) above, further including
an attaching part to which a lens barrel is attached, in which
when an operation for detaching the lens barrel from the attaching part is detected, the switching control unit performs control for closing a mechanical shutter even with a setting for curbing sound generated in the first period and the second period.

(19)
An information processing method performed by an information processing device, the method including:
user interface processing of enabling selection of whether or not to curb at least a part of sound generated in a first period from a power-on state until issuance of a transition instruction to a power-off state and a second period from the issuance of the transition instruction until the power-on state; and
switching processing of changing control related to sound according to a selection result of the user interface processing.

(20)
A program causing an information processing device to execute:
user interface processing of enabling selection of whether or not to curb at least a part of sound generated in a first period from a power-on state until issuance of a transition instruction to a power-off state and a second period from the issuance of the transition instruction until the power-on state; and
switching processing of changing control related to sound according to a selection result of the user interface processing.

REFERENCE SIGNS LIST

1 Imaging device
3 Lens barrel
4 Attaching part
8 Operation element
11 Mechanical shutter mechanism
13 Diaphragm mechanism
32 Camera signal processing unit 38 Camera control unit
40 Sound input unit
61 User interface control unit
62 Switching control unit
63 Automatic identification processing unit
64 Scene specifying unit

The invention claimed is:

1. An imaging device, comprising:
a central processing unit (CPU) configured to:
perform user interface processing of enabling selection of whether to curb at least a part of sound generated in a first period from a power-on state until issuance of a transition instruction to a power-off state and a second period from the issuance of the transition instruction until the power-on state; and
change control related to sound based on a selection result of the user interface processing.

2. The imaging device according to claim 1, wherein the user interface processing includes processing of enabling selection of whether to curb at least a part of the sound generated in the first period.

3. The imaging device according to claim 1, wherein the user interface processing includes processing of enabling selection of whether to curb at least a part of the sound generated in the second period.

4. The imaging device according to claim 1, wherein the user interface processing includes presentation for selecting whether or not to curb a drive sound of a mechanical shutter mechanism based on a release operation.

5. The imaging device according to claim 1, wherein the user interface processing includes presentation for selecting whether to curb an operation sound of an operation element.

6. The imaging device according to claim 1, wherein the user interface processing includes presentation for selecting whether to curb a drive sound of a diaphragm mechanism at a time of autofocus control.

7. The imaging device according to claim 1, wherein the user interface processing includes presentation for selecting whether or not to curb a drive sound of a mechanical shutter mechanism generated when a mechanical shutter is closed based on the transition instruction.

8. The imaging device according to claim 1, wherein the user interface processing includes presentation for selecting whether to curb a drive sound of a mechanical shutter mechanism in an auto pixel mapping function.

9. The imaging device according to claim 1, wherein the user interface processing includes presentation that enables setting of whether to curb sound for each type of sound generated in the first period or the second period.

10. The imaging device according to claim 1, wherein the user interface processing includes presentation of an operation element for setting details as to whether to curb sound generated in the first period or the second period.

11. The imaging device according to claim 10, wherein in the setting details, the CPU is further configured to perform presentation that enables setting of a setting item as to whether to curb a drive sound of a diaphragm mechanism at a time of autofocus control, a setting item as to whether to curb a drive sound of a mechanical shutter mechanism generated when a mechanical shutter is closed based on the transition instruction, and a setting item as to whether to curb a drive sound of the mechanical shutter mechanism in an auto pixel mapping function.

12. The imaging device according to claim 10, wherein in the setting details, the CPU is further configured to display an unchangeable item.

13. The imaging device according to claim 12, wherein the unchangeable item includes a setting item as to whether to curb a drive sound of a mechanical shutter mechanism based on a release operation and a setting item as to whether to curb an operation sound of the operation element.

14. The imaging device according to claim 1, wherein the CPU is further configured to:
automatically identify subject, and
perform control for curbing sound generated in the first period or the second period when the CPU recognizes the subject as an organism.

15. The imaging device according to claim 1, wherein the CPU is further configured to:
perform focus control by an operation, and
perform control for curbing sound generated in the first period or the second period.

16. The imaging device according to claim 1, wherein the CPU is further configured to:
specify an imaging scene,
perform control for curbing sound generated in the first period or the second period based on the specified imaging scene.

17. The imaging device according to claim 1, further comprising circuitry to which a sound signal is input, wherein
the CPU is further configured to perform control for curbing sound generated in the first period or the second period in a case where a signal level of the sound signal input to the circuitry is equal to or less than a value.

18. The imaging device according to claim 1, further comprising an attaching part to which a lens barrel is attached, wherein
when an operation for detaching the lens barrel from the attaching part is detected, the CPU is further configured to perform control for closing a mechanical shutter even with a setting for curbing sound generated in the first period or the second period.

19. An information processing method performed by an information processing device, the information processing method comprising:
user interface processing of enabling selection of whether to curb at least a part of sound generated in a first period from a power-on state until issuance of a transition instruction to a power-off state and a second period from the issuance of the transition instruction until the power-on state; and
switching processing of changing control related to sound based on a selection result of the user interface processing.

20. A non-transitory computer-readable medium having stored thereon computer-executable instructions which, when executed by a computer, cause the computer to execute operations, the operations comprising:
user interface processing of enabling selection of whether to curb at least a part of sound generated in a first period from a power-on state until issuance of a transition instruction to a power-off state and a second period from the issuance of the transition instruction until the power-on state; and switching processing of changing control related to sound based on a selection result of the user interface processing.

\* \* \* \* \*